United States Patent
Kim et al.

(10) Patent No.: US 12,436,270 B2
(45) Date of Patent: Oct. 7, 2025

(54) METHOD, APPARATUS AND COMPUTER PROGRAM FOR COMPRESSING NDT MAP DATA FOR AUTONOMOUS DRIVING SYSTEM

(71) Applicant: RideFlux Inc., Jeju-Si (KR)

(72) Inventors: Jiwoong Kim, Seoul (KR); Hawook Jeong, Seoul (KR)

(73) Assignee: RideFlux Inc., Jeju-Si (KR)

(*) Notice: Subject to any disclaimer, the term of this patent is extended or adjusted under 35 U.S.C. 154(b) by 463 days.

(21) Appl. No.: 18/058,647

(22) Filed: Nov. 23, 2022

(65) Prior Publication Data
US 2023/0273311 A1    Aug. 31, 2023

(30) Foreign Application Priority Data
Feb. 28, 2022    (KR) .................. 10-2022-0025712

(51) Int. Cl.
*G01S 13/89*    (2006.01)
*B60W 60/00*    (2020.01)
*G06N 3/0455*    (2023.01)

(52) U.S. Cl.
CPC ............ *G01S 13/89* (2013.01); *G06N 3/0455* (2023.01); *B60W 60/001* (2020.02)

(58) Field of Classification Search
CPC .... G01C 21/30; G01C 21/005; G01C 21/387; G06V 20/64; G01S 13/89; G06N 3/0455;
(Continued)

(56) References Cited

U.S. PATENT DOCUMENTS

2019/0242714 A1    8/2019  Shaked
2020/0089236 A1*   3/2020  Doemling ......... G06F 18/24155
(Continued)

FOREIGN PATENT DOCUMENTS

CN    103187978 A    7/2013
JP    2003-023357 A  1/2003
(Continued)

OTHER PUBLICATIONS

Zhou et al. (NDT-Transformer: Large-Scale 3D Point Cloud Localisation using the Normal Distribution Transform Representation, 2021) (Year: 2021).*

(Continued)

*Primary Examiner* — Mohammad K Islam
(74) *Attorney, Agent, or Firm* — Studebaker Brackett PLLC

(57) ABSTRACT

Provided are a method, apparatus, and a computer program for compressing NDT map data for an autonomous driving system. Various embodiments of the present invention provide a method of compressing normal distribution transform (NDT) map data generated by modeling a three-dimensional (3D) point cloud for a predetermined area as a normal distribution set for an autonomous driving system, which is performed by a computing device, the method including: processing mean vector data included in the NDT map data; processing covariance matrix data included in the NDT map data; and generating compressed NDT map data using the processed mean vector data and the processed covariance matrix data.

13 Claims, 4 Drawing Sheets

(58) Field of Classification Search
CPC ... B60W 60/001; H04N 19/60; H04N 19/597; G06F 16/29; G06F 16/1744
See application file for complete search history.

(56) References Cited

U.S. PATENT DOCUMENTS

| | | | |
|---|---|---|---|
| 2021/0010814 A1* | 1/2021 | Demir | G01C 21/28 |
| 2024/0175687 A1* | 5/2024 | Koda | G06T 7/70 |

FOREIGN PATENT DOCUMENTS

| | | |
|---|---|---|
| JP | 2009-055308 A | 3/2009 |
| JP | 2017-191539 A | 10/2017 |
| KR | 10-0540899 B1 | 1/2006 |
| KR | 10-2021-0096285 A | 8/2021 |
| KR | 10-2021-0119524 A | 10/2021 |
| KR | 10-2022-0002106 A | 1/2022 |
| WO | 2020/188403 A1 | 9/2020 |

OTHER PUBLICATIONS

Liu (High Definition Map for Automated Driving: Overview and Analysis, 2020). (Year: 2020).*

Stoyanov (Reliable Autonomous Navigation in Semi-Structured Environments using the Three-Dimensional Normal Distributions Transform (3D-NDT), 2012) (Year: 2012).*

An Office Action; "Notice of Reasons for Refusal," mailed by the Japanese Patent Office on Aug. 7, 2023, which corresponds to Japanese Patent Application No. 2022-187490 and is related to U.S. Appl. No. 18/058,647.

Weisong Wen et al., "Performance Analysis of NDT-based Graph SLAM for Autonomous Vehicle in Diverse Typical Driving Scenarios of Hong Kong", arXiv.org, Cornell University Library, Ithaca, NY 14853, 24 pages, Oct. 11, 2018, XP081428139.

M. Magnusson et al., "Appearance-based loop detection from 3D laser data using the normal distributions transform", 2009 IEEE International Conference on Robotics and Automation: (ICRA), pp. 23-28, May 1, 2009, doi: 10.1109/ROBOT.2009.5152712, IEEE, XP055750878.

The extended European search report issued by the European Patent Office on Jun. 5, 2023, which corresponds to European Patent Application No. 18058647-1208 and is related to U.S. Appl. No. 18/058,647.

An Office Action mailed by the Korean Intellectual Property Office on Jan. 12, 2023, which corresponds to Korean Patent Application No. 10-2022-0025712 and is related to U.S. Appl. No. 18/058,647.

* cited by examiner

METHOD, APPARATUS AND COMPUTER PROGRAM FOR COMPRESSING NDT MAP DATA FOR AUTONOMOUS DRIVING SYSTEM

CROSS-REFERENCE TO RELATED APPLICATION

This application claims priority to and the benefit of Korean Patent Application No. 10-2022-0025712, filed on Feb. 28, 2022, the disclosure of which is incorporated herein by reference in its entirety.

BACKGROUND

1. Field of the Invention

Various embodiments of the present invention relate to a method, apparatus, and computer program for compressing normal distribution transform (NDT) map data for an autonomous driving system.

2. Discussion of Related Art

For the convenience of a user driving a vehicle, various sensors, electronic devices, and the like (e.g., an advanced driver assistance system (ADAS)) are being provided, and in particular, technology development for an autonomous driving system for a vehicle that recognizes the surrounding environment without driver intervention and automatically drives to a given destination according to the recognized surrounding environment is being actively developed.

Here, an autonomous driving vehicle is a vehicle equipped with an autonomous driving system function that recognizes the surrounding environment without driver intervention and automatically drives to a given destination according to the recognized surrounding environment.

In order to control the driving operation of an autonomous driving vehicle without driver intervention, a map that the autonomous vehicle may understand on its own is required. As such, "computer-readable road environment information stored in a database in advance" is referred to as a "digital map." In particular, a digital map for autonomous driving is referred to as a "precision map," a "high definition (HD) map," or a "highly automated driving (HAD) map."

Conventionally, as such a digital map or precision map, a three-dimensional (3D) point cloud map generated based on a 3D point cloud (e.g., a point cloud collected through LiDAR, radar, and a depth camera) has been used. However, there is a problem that it is difficult to use a map for a wide area because a data size of the 3D point cloud map is too large.

SUMMARY OF THE INVENTION

The present invention provides a method, apparatus, and computer program for compressing normal distribution transform (NDT) map data for an autonomous driving system capable of greatly reducing restrictions on scalability of a driving area of the autonomous driving system and improving efficiency of autonomous driving where a stable real-time operation is important, by processing an expression method of the NDT map data generated by modeling a three-dimensional point cloud for a predetermined area as a normal distribution set to generate the compressed NDT map data.

Objects of the present invention are not limited to the objects described above, and other objects that are not mentioned may be obviously understood by those skilled in the art from the following description.

The present disclosure may provide a method of compressing NDT map data generated by modeling a three-dimensional (3D) point cloud for a predetermined area as a normal distribution set for an autonomous driving system, which is performed by a computing device, the method including: processing mean vector data included in the NDT map data; processing covariance matrix data included in the NDT map data; and generating compressed NDT map data using the processed mean vector and the processed covariance matrix.

The method may further include: generating a plurality of 3D lattice spaces by latticing the 3D point cloud for the predetermined area; modeling each of the 3D point clouds included in each of the plurality of generated 3D lattice spaces as a plurality of normal distributions; calculating a mean vector for each of the plurality of normal distributions corresponding to each of the plurality of generated 3D lattice spaces, and generating mean vector data using the calculated mean vector; calculating a covariance matrix for each of the plurality of normal distributions corresponding to each of the generated 3D lattice spaces, and generating covariance matrix data using the calculated covariance matrix; and generating NDT map data for the predetermined area using the generated mean vector data and the generated covariance matrix data.

The generated mean vector data may include a center vector for a center position of each of the plurality of generated 3D lattice spaces and an offset vector from the center position, and the processing of the mean vector data may include: transforming an expression method of the center vector; transforming an expression method of the offset vector; and generating compressed mean vector data using the transformed center vector and the transformed offset vector.

The transforming of the expression method of the center vector may include transforming the center vector into a form of a tree data structure, wherein the tree data structure may include one or more nodes and the one or more nodes may have a non-linear hierarchical structure.

The transforming of the expression method of the offset vector may include: setting a first reference range based on a length of any one side of each of the plurality of generated 3D lattice spaces; and transforming a component of the offset vector for each of the plurality of generated 3D lattice spaces into a value within the set first reference range.

The generated covariance matrix data may include a standard deviation and a rotational transform angle of points included in each of the plurality of generated 3D lattice spaces, and the processing of the covariance matrix data may include: transforming an expression method of the standard deviation; transforming an expression method of the rotational transform angle; and generating compressed covariance matrix data using the transformed standard deviation and the transformed rotational transform angle.

The transforming of the expression method of the standard deviation may include: setting a second reference range based on a length of a diagonal in the plurality of generated 3D lattice spaces; and transforming the standard deviation for each of the plurality of generated 3D lattice spaces into a value within the set second reference range.

The transforming of the expression method of the rotational transform angle may include: setting a reference rotation range for each of an X axis, a Y axis, and a Z axis;

and transforming the rotational transform angle into a value within the set reference rotation range.

The method may further include: setting a compression degree for each of the mean vector data and the covariance matrix data based on preset registration performance, and processing the mean vector data and the covariance matrix data according to the set compression degree, wherein, when the same registration performance is set, the compression degree of the covariance matrix data is set to be greater than or equal to the compression degree of the mean vector data.

The method may further include: calculating a frequency for each of a plurality of objects included in the NDT map data, and setting a compression degree of mean vector data and covariance matrix data for areas corresponding to each of the plurality of objects on the NDT map data based on the calculated frequency.

The method may further include, when the first object and the second object disposed in mutually adjacent positions among the plurality of objects included in the NDT map data have the same attribute, grouping the first object and the second object into one group, and the processing of the mean vector data may include combining mean vector data of objects included in the one group to generate one set of mean vector data and processing the generated mean vector data, and the processing of the covariance matrix data may include combining covariance matrix data of the objects included in the one group to generate one covariance matrix data and processing the generated one covariance matrix data.

The method may further include grouping two or more objects having a preset positional relationship among a plurality of objects included in the NDT map data, in which the processing of the mean vector data may include combining mean vector data of objects included in the one group to generate one set of mean vector data and processing the generated mean vector data, and the processing of the covariance matrix data may include combining covariance matrix data of the objects included in the one group to generate one covariance matrix data and processing the generated one covariance matrix data.

The method may further include extracting the compressed NDT map data using the NDT map data as an input of a pre-trained artificial intelligence (AI) model, wherein the pre-trained AI model may include an encoder and a decoder and may be a model trained using pieces of compressed NDT map data as training data.

The present disclosure may provide a computing device for performing a method of compressing NDT map data for an autonomous driving system, including: a processor; a network interface; a memory; and a computer program loaded into the memory and executed by the processor, in which the computer program may include: an instruction for processing mean vector data included in NDT map data generated by modeling a 3D point cloud for a predetermined area as a normal distribution set; an instruction for processing covariance matrix data included in the NDT map data; and an instruction for generating compressed NDT map data using the processed mean vector and the processed covariance matrix.

The present disclosure may provide a computer program stored in a computer-readable recording medium that works in conjunction with a computing device to execute a method of compressing NDT map data including: processing mean vector data included in NDT map data generated by modeling a 3D point cloud for a predetermined area as a normal distribution set; processing mean vector data included in the NDT map data; processing covariance matrix data included in the NDT map data; and generating compressed NDT map data using the processed mean vector and the processed covariance matrix.

Other specific details of the invention are contained in the detailed description and drawings.

DETAILED DESCRIPTION OF EXEMPLARY EMBODIMENTS

Figure 1:
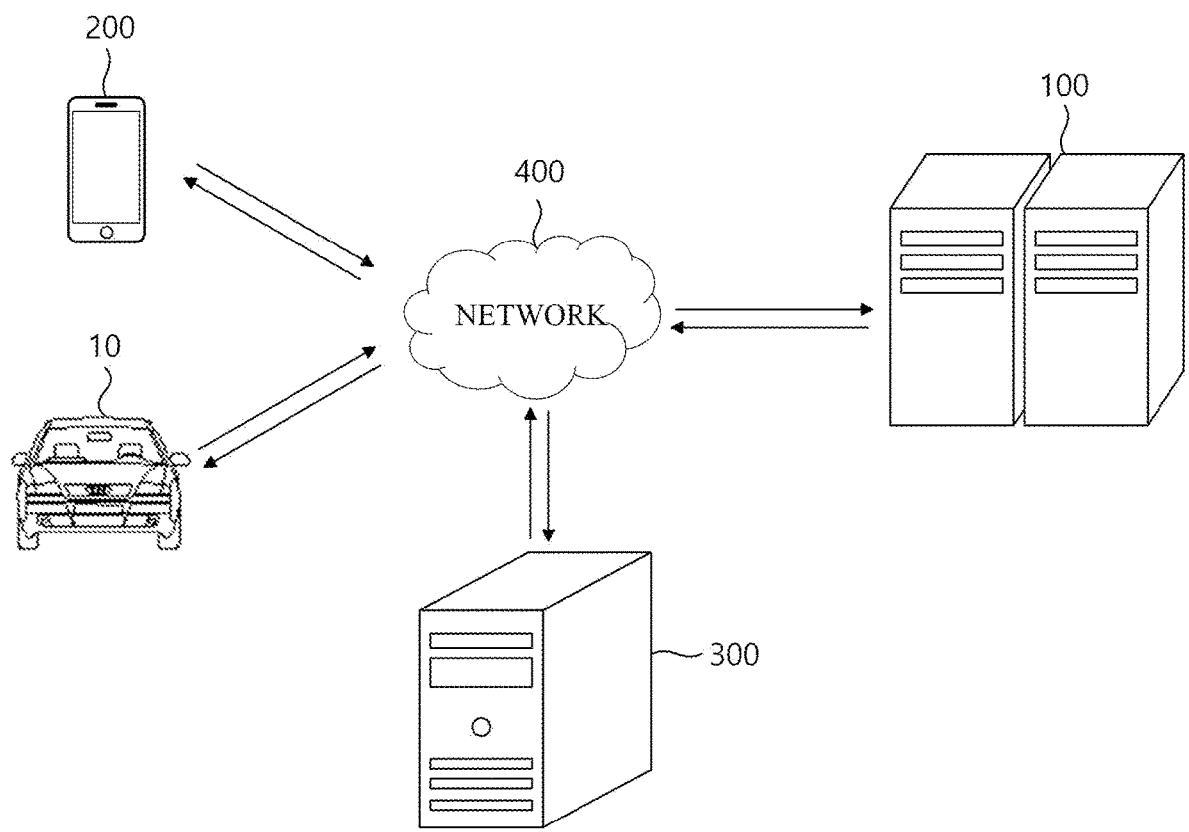
FIG. 1 is a diagram illustrating an autonomous driving system according to an embodiment of the present invention.

Various advantages and features of the present invention and methods accomplishing them will become apparent from the following description of embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims.

Terms used in the present specification are for explaining embodiments rather than limiting the present invention. Unless otherwise stated, a singular form includes a plural form in the present specification. "Comprise" and/or "comprising" used in the present invention indicate(s) the presence of stated components but do(es) not exclude the presence or addition of one or more other components. Like reference numerals refer to like components throughout the specification and "and/or" includes each of the components described and includes all combinations thereof. Although "first," "second," and the like are used to describe various components, it goes without saying that these components are not limited by these terms. These terms are used only to distinguish one component from other components. Therefore, it goes without saying that a first component described below may be a second component within the technical scope of the present invention.

Unless defined otherwise, all terms (including technical and scientific terms) used in the present specification have the same meanings commonly understood by those skilled in the art to which the present invention pertains. In addition, terms defined in commonly used dictionary are not ideally or excessively interpreted unless explicitly defined otherwise.

Further, the term "unit" or "module" used herein means a hardware component such as software, FPGA, or ASIC and performs predetermined functions. However, the term "unit" or "module" is not meant to be limited to software or hardware. The "unit" or "module" may be configured to be stored in a storage medium that can be addressed or may be configured to regenerate one or more processors. Accordingly, for example, the "unit" or "module" includes components such as software components, object-oriented software components, class components, and task components, processors, functions, attributes, procedures, subroutines, segments of a program code, drivers, firmware, a microcode, a circuit, data, a database, data structures, tables, arrays, and variables. Functions provided in components, "units," or "modules" may be combined into fewer components, "units," or "modules" or further separated into additional components, "units," or "modules."

Spatially relative terms "below," "beneath," "lower," "above," "upper," and the like may be used to easily describe the correlation between one component and other components as illustrated in drawings. The spatially relative terms should be understood as terms including different directions of components during use or operation in addition to the directions illustrated in the drawings. For example, in a case in which a component illustrated in the drawings is turned over, a component described as "below" or "beneath" the component may be placed "above" the component. Therefore, the illustrative term "below" may include both downward and upward directions. The components can also be aligned in different directions, and therefore the spatially relative terms can be interpreted according to the alignment.

In this specification, the computer may be any kind of hardware devices including at least one processor, and may be understood as including a software configuration which is operated in the corresponding hardware device according to the embodiment. For example, the computer may be understood to be any of a smart phone, a tablet personal computer (PC), a desktop, a notebook, and user clients and applications running on each device, but is not limited thereto.

Hereinafter, embodiments of the present invention will be described in detail with reference to the accompanying drawings.

Each step described in the present specification is described as being performed by a computer, but subjects of each step are not limited thereto, and according to embodiments, at least some steps can also be performed on different devices.

In order to overcome the problems of the conventional digital map, normal distribution transform (NDT) map data generated by modeling a three-dimensional (3D) point cloud as a normal distribution set based on an NDT may be used. However, when a driving area of an autonomous driving system is very wide, since a data size of a 3D point cloud expressing the driving area is also very large, there may be a limit that a size of the NDT map data created using the 3D point cloud is also bound to be large.

This affects scalability of the driving area of the autonomous driving system. As the driving area of the autonomous driving system is expanded, the size of the NDT map data will also increase, and the size of the NDT map data that is too large acts as a limit to the expansion of the driving area of the autonomous driving system.

For the purpose of solving these problems, there are provided a method, apparatus, and computer program for compressing NDT map data for an autonomous driving system capable of effectively compressing the NDT map data to secure scalability of a driving area and efficiently use the NDT map data in the autonomous driving system operating in real time. Hereinafter, the method, apparatus, and computer program for compressing NDT map data for an autonomous driving system according to various embodiments of the present invention will be described with reference to FIGS. 1 to 6.

FIG. 1 is a diagram illustrating an autonomous driving system according to an embodiment of the present invention.

Referring to FIG. 1, the autonomous driving system according to the embodiment of the present invention may include a computing device 100, a user terminal 200, an external server 300, and a network 400.

Here, the autonomous driving system illustrated in FIG. 1 is according to an embodiment, and components of the autonomous driving system are not limited to the embodiment illustrated in FIG. 1, and may be added, changed, or omitted as necessary.

In an embodiment, the computing device 100 may perform various operations for autonomous driving control of an autonomous driving vehicle 10.

To this end, first, the computing device 100 may perform an operation of measuring a position and an attitude of the autonomous driving vehicle 10 or an operation of recognizing the surrounding environment of the autonomous driving vehicle 10. For example, the computing device 100 may collect sensor data from a sensor (e.g., LiDAR sensor, radar sensor, camera sensor, etc.) provided inside the autonomous driving vehicle 10, and may utilize the collected sensor data to measure the position and attitude of the autonomous driving vehicle 10 and/or recognize the surrounding environment of the autonomous driving vehicle 10 by analyzing the collected sensor data.

In addition, the computing device 100 may generate and store NDT map data for a predetermined area for autonomous driving control of the autonomous driving vehicle 10, and generate and store the compressed NDT map data by processing a normal distribution set included in the NDT map data, that is, generate the NDT map data with a small data size, thereby securing scalability of a driving area and generating the NDT map data that may be efficiently used in the autonomous driving system operating in real time. This will be described below in detail.

In various embodiments, the computing device 100 may be connected to the user terminal 200 through the network 400, and the position and attitude of the autonomous driving vehicle 10 measured by analyzing sensor data, and various types of information related to autonomous driving such as the recognized surrounding environment and the generated NDT map data of the autonomous driving vehicle 10 may be provided to the user terminal 200.

Here, the user terminal 200 may be an infotainment system provided inside the vehicle 10, but is not limited thereto. Accordingly, the user terminal 200 is a wireless communication device that guarantees portability and mobility, and may be a portable terminal that a passenger riding inside the vehicle 10 may carry. For example, examples of the user terminal 200 may include all types of handheld-based wireless communication devices such as a navigation device, a personal communication system (PCS), a global system for mobile communication (GSM), a personal digital cellular (PDC) phone, a personal handyphone system (PHS), a personal digital assistant (PDA), international mobile telecommunication (IMT)-2000, code division multiple access (CDMA)-2000, W-code division multiple access (W-CDMA), a wireless broadband Internet (WiBro) terminal, a smart phone, a smart pad, and a tablet PC, but are not limited thereto.

In addition, here, the network 400 may be a connection structure capable of exchanging information between respective nodes such as a plurality of terminals and servers. For example, the network 400 may include a local area network (LAN), a wide area network (WAN), the Internet (World Wide Web (WWW)), a wired/wireless data communication network, a telephone network, a wired/wireless television communication network, and the like.

In addition, examples of the wireless data communication network may include 3G, 4G, 5G, $3^{rd}$ Generation Partnership Project (3GPP), $5^{th}$ Generation Partnership Project (5GPP), long term evolution (LTE), world interoperability for microwave access (WIMAX), Wi-Fi, Internet, a local area network (LAN), a wireless local area network (WLAN), a wide area network (WAN), a personal area network (PAN), radio frequency, a Bluetooth network, a near-field communication (NFC) network, a satellite broadcast network, an analog broadcast network, a digital multimedia broadcasting (DMB) network, and the like, but are not limited thereto.

In one embodiment, the external server 300 may be connected to the computing device 100 through the network 400, and the computing device 100 may store and manage various types of information and data (e.g., a plurality of point clouds) necessary to perform the method of compressing NDT map data for an autonomous driving system or receive, store, and manage various types of information and data (e.g., compressed NDT map data) generated by performing the method of compressing NDT map data for an autonomous driving system. For example, the external server 300 may be a storage server separately provided outside the computing device 100, but is not limited thereto. Hereinafter, a hardware configuration of the computing device 100 for performing the method of compressing NDT map data for an autonomous driving system will be described with reference to FIG. 2.

Figure 2:
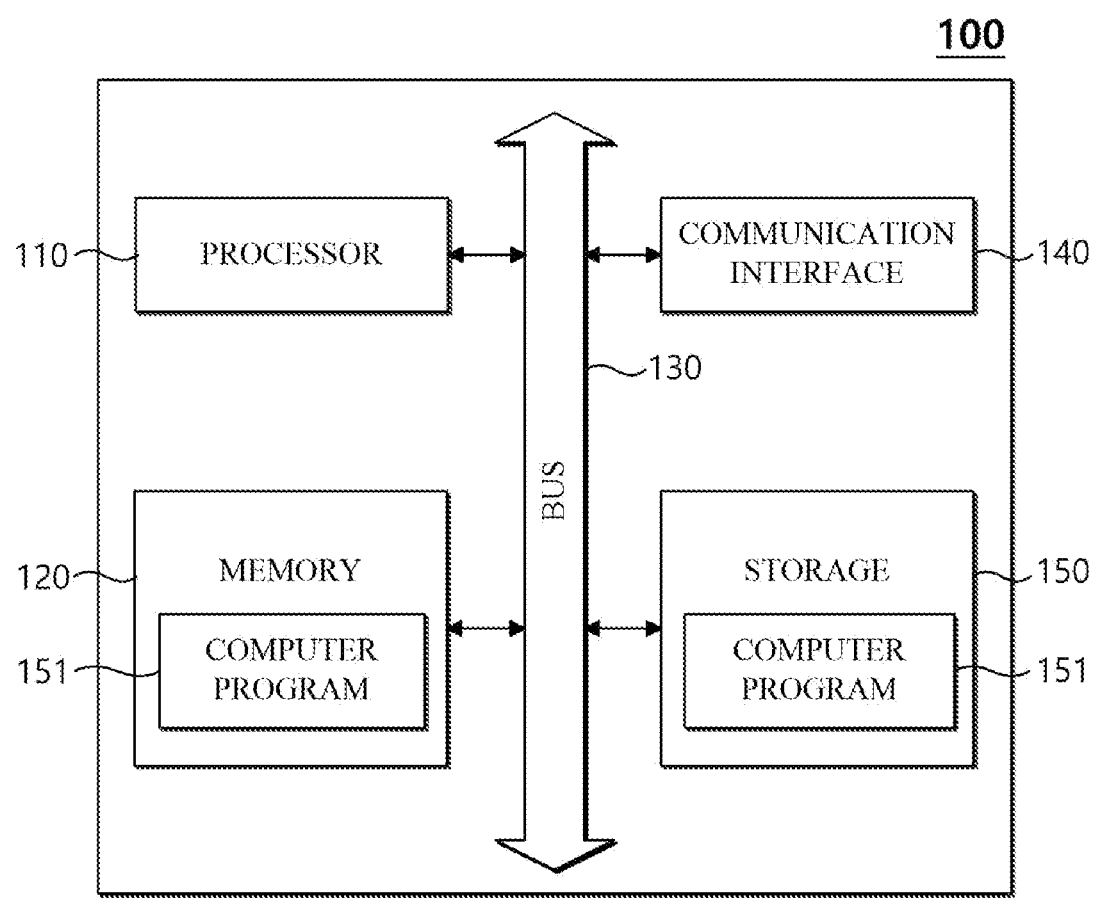
FIG. 2 is a hardware configuration diagram of a computing device for performing a method of compressing normal distribution transform (NDT) map data for an autonomous driving system according to another embodiment of the present invention.

FIG. 2 is a hardware configuration diagram of a computing device for performing a method of compressing NDT map data for an autonomous driving system according to another embodiment of the present invention.

Referring to FIG. 2, according to another embodiment of the present invention, the computing device 100 for performing a method of compressing NDT map data for an autonomous driving system may include one or more processors 110, a memory 120 into which a computer program 151 executed by the processor 110 is loaded, a bus 130, a communication interface 140, and a storage 150 for storing the computer program 151. However, only the components related to the embodiment of the present invention are illustrated in FIG. 2. Accordingly, those skilled in the art to which the present invention pertains may understand that general-purpose components other than those illustrated in FIG. 2 may be further included.

The processor 110 controls an overall operation of each component of the computing device 100. The processor 110 may be configured to include a central processing unit (CPU), a micro processor unit (MPU), a micro controller unit (MCU), a graphics processing unit (GPU), or any type of processor well known in the art of the present invention.

In addition, the processor 110 may perform an operation on at least one application or program for executing the method according to the embodiments of the present invention, and the computing device 100 may include one or more processors.

According to various embodiments, the processor 110 may further include a random access memory (RAM) (not illustrated) and a read-only memory (ROM) for temporarily and/or permanently storing signals (or data) processed in the processor 110. In addition, the processor 110 may be implemented in the form of a system-on-chip (SoC) including at least one of the graphics processing unit, the RAM, and the ROM.

The memory 120 stores various types of data, commands and/or information. The memory 120 may load the computer program 151 from the storage 150 to execute methods/operations according to various embodiments of the present disclosure. When the computer program 151 is loaded into the memory 120, the processor 110 may perform the method/operation by executing one or more instructions constituting the computer program 151. The memory 120 may be implemented as a volatile memory such as a RAM, but the technical scope of the present disclosure is not limited thereto.

The bus 130 provides a communication function between the components of the computing device 100. The bus 130 may be implemented as various types of buses, such as an address bus, a data bus, and a control bus.

The communication interface 140 supports wired/wireless Internet communication of the computing device 100. In addition, the communication interface 140 may support various communication methods other than the Internet communication. To this end, the communication interface 140 may be configured to include a communication module well known in the art of the present invention. In some embodiments, the communication interface 140 may be omitted.

The storage 150 may non-temporarily store the computer program 151. When a process of compressing NDT map data for an autonomous driving system is performed through the computing device 100, the storage 150 may store various types of information necessary to provide the process of compressing NDT map data for an autonomous driving system.

The storage 150 may be configured to include a nonvolatile memory, such as a ROM, an erasable programmable ROM (EPROM), an electrically erasable programmable ROM (EEPROM), and a flash memory, a hard disk, a removable disk, or any well-known computer-readable recording medium in the art to which the present invention pertains.

The computer program 151 may include one or more instructions to cause the processor 110 to perform methods/operations according to various embodiments of the present invention when loaded into the memory 120. That is, the processor 110 may perform the method/operation according to various embodiments of the present invention by executing the one or more instructions.

In one embodiment, the computer program 151 may include one or more instructions to perform the method of compressing NDT map data, including processing mean vector data included in NDT map data generated by modeling a 3D point cloud for a predetermined area as a normal distribution set for an autonomous driving system, processing covariance matrix data included in the NDT map data, and generating compressed NDT map data using the processed mean vector and the processed covariance matrix.

Operations of the method or algorithm described with reference to the embodiment of the present invention may be directly implemented in hardware, in software modules executed by hardware, or in a combination thereof. The software module may reside in a RAM, a ROM, an EPROM, an EEPROM, a flash memory, a hard disk, a removable disk, a compact disc read-only memory (CD-ROM), or any form of computer-readable recording medium known in the art to which the invention pertains.

The components of the present invention may be embodied as a program (or application) and stored in a medium for execution in combination with a computer which is hardware. The components of the present invention may be executed in software programming or software elements, and similarly, embodiments may be realized in a programming or scripting language such as C, C++, Java, and assembler, including various algorithms implemented in a combination of data structures, processes, routines, or other programming constructs. Functional aspects may be implemented in algorithms executed on one or more processors. Hereinafter, the method of compressing NDT map data for an autonomous driving system performed by the computing device 100 will be described with reference to FIGS. 3 to 6.

Figure 3:
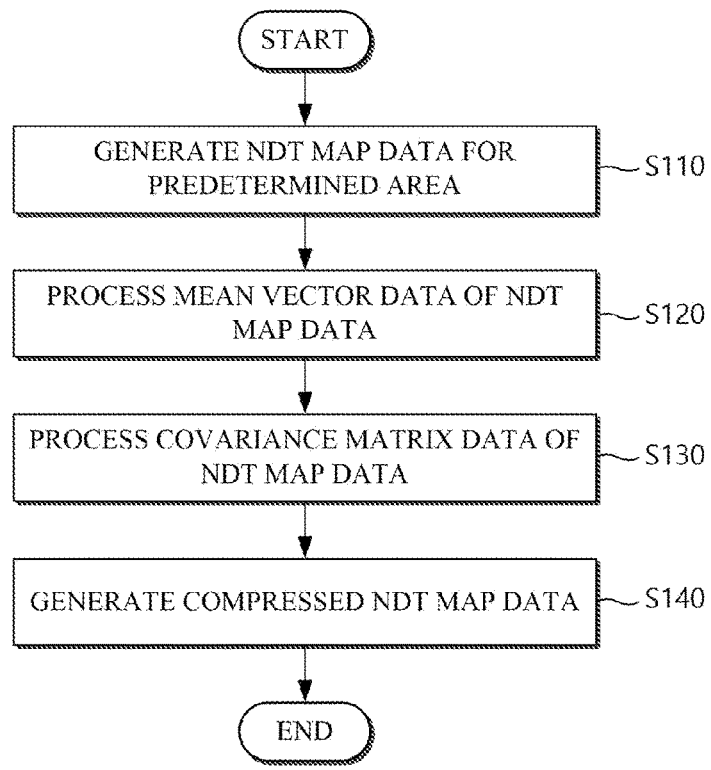
FIG. 3 is a flowchart of a method of compressing NDT map data for an autonomous driving system according to another embodiment of the present invention.

FIG. 3 is a flowchart of a method of compressing NDT map data for an autonomous driving system according to another embodiment of the present invention.

Referring to FIG. 3, in operation S110, the computing device 100 may generate the NDT map data for the predetermined area.

In various embodiments, the computing device 100 may generate the NDT map data by modeling the 3D point cloud for the predetermined area as a normal distribution set based on the NDT technology.

More specifically, first, the computing device 100 may collect a 3D point cloud measured through a sensor (e.g., LiDAR, radar, and camera, etc.) that is located within a predetermined area or provided in the autonomous driving vehicle 10 driving within the predetermined area, and generate a plurality of 3D lattice spaces by latticing the collected 3D point cloud, that is, divide the 3D point cloud into units of lattice spaces of a predetermined size.

In this case, the plurality of 3D lattice spaces may have a regular hexagonal shape (e.g., 10 cm×10 cm×10 cm or 2 cm×2 cm×2 cm, etc.) of the same size as an embodiment, but are not limited thereto. In various embodiments, the plurality of 3D lattice spaces may have a rectangular parallelepiped shape or the like.

Thereafter, the computing device 100 may model a plurality of 3D lattice spaces as a normal distribution set.

For example, first, the computing device 100 may generate a plurality of normal distributions corresponding to each of the plurality of 3D lattice spaces by modeling each of the plurality of 3D lattice spaces as a normal distribution.

Thereafter, the computing device 100 may calculate a mean vector of points included in each of the plurality of normal distributions as position information of each of the plurality of normal distributions, and may generate mean vector data using the calculated mean vector. Here, the mean vector may include, but is not limited to, a center vector for a center position of each of the plurality of 3D lattice spaces and an offset vector indicating a distance from the center position.

Thereafter, the computing device 100 may calculate a covariance matrix of points included in each of the plurality of normal distributions as information on shapes and directions of each of the plurality of normal distributions, and generate covariance matrix data using the calculated covariance matrix. However, the present invention is not limited thereto.

Thereafter, the computing device 100 may generate the NDT map data including the mean vector data and the covariance matrix data generated according to the above process.

Here, the computing device 100 is described as directly generating the NDT map data for the predetermined area by directly collecting sensor data for the predetermined area, but is not limited thereto, and may be implemented in the form of receiving the NDT map data generated in advance through another external system and using the NDT map data.

In operation S120, the computing device 100 may generate compressed mean vector data by processing the mean vector data included in the NDT map data generated through operation S110.

Here, the mean vector is expressed as three values ($\mu_x$, $\mu_y$, and $\mu_z$) as a 3D vector. When coordinate values of the center positions of each of the plurality of 3D lattice spaces are $c_x$, $c_y$, and $c_z$, the mean vector can be expressed as in Expression 1 below.

$$\mu_i = c_i + d_i \qquad \text{<Expression 1>}$$

Here, i may denote x, y, or z, $\mu_i$ may denote an i-axis component value of the mean vector, $c_i$ may denote an i-axis component value of the center vector, and $d_i$ may denote an i-axis component value of the offset vector (degree of deviation from the center position of the 3D lattice space).

Accordingly, the computing device 100 may generate the compressed mean vector data by processing each of the center vector and the offset vector.

In operation S130, the computing device 100 may generate the compressed covariance matrix data by processing the covariance matrix data included in the NDT map data generated through operation S110.

Here, each piece of covariance matrix data may be expressed corresponding to one 3D ellipsoid, and the 3D ellipsoid may be specified as a length in three axial directions and three rotational transform angles, and the covariance matrix may include information on three lengths of the corresponding 3D ellipsoid and information on three rotational transform angles. Here, the length information in the axial direction of the ellipsoid may be a standard deviation, as will be described below. Accordingly, the computing device 100 may finally generate the compressed covariance matrix data by processing each of the standard deviation and rotational transform angle of the 3D ellipsoid corresponding to the covariance matrix data.

In addition, here, the method of compressing NDT map data for an autonomous driving system illustrated in FIG. 3 is illustrated as including performing processing on the covariance matrix data after processing the mean vector data. However, this is only to distinguish the process of processing the mean vector data and the process of processing the covariance matrix data, but is not limited thereto, and the process of processing the covariance matrix data may be performed first, or the processes of processing the mean vector data and the covariance matrix data may be performed simultaneously. Hereinafter, the process of generating compressed mean vector data and the process of generating compressed covariance matrix data will be described in more detail with reference to FIGS. 4 to 6.

Figure 4:
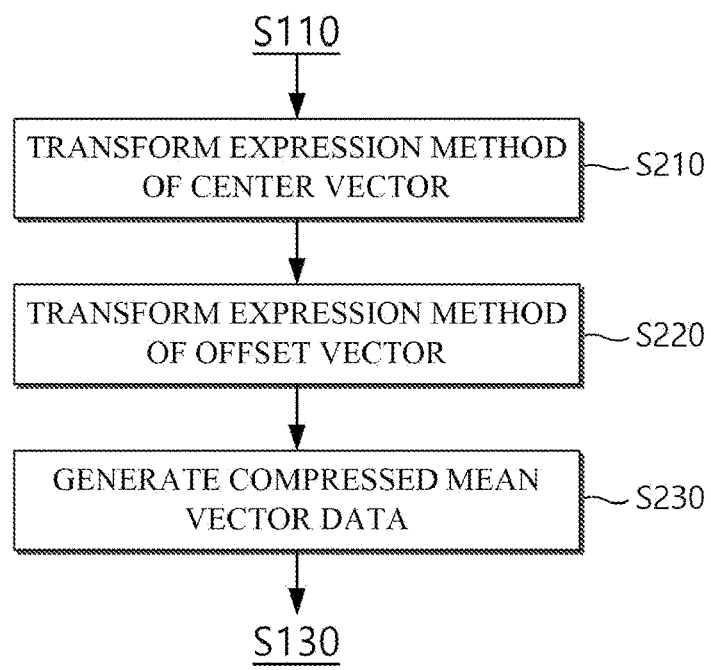
FIG. 4 is a flowchart for describing a method of processing mean vector data according to various embodiments.

FIG. 4 is a flowchart for describing a method of processing mean vector data according to various embodiments.

Referring to FIG. 4, in operation S210, the computing device 100 may transform the expression method of the center vector included in the mean vector data.

In various embodiments, the computing device 100 may transform the center vector into the form of a tree data structure. Here, the tree data structure includes one or more nodes, and may mean that the one or more nodes have a non-linear hierarchical structure, but is not limited thereto.

In various embodiments, the computing device 100 may transform the center vector into the form of an octree. For example, the computing device 100 may express a center vector (x, y, and z coordinate values) using the octree having a depth of L.

In general, the environment of the driving area of the autonomous driving system is not uniformly distributed from the underground to the air, but most of the space, such as the underground and the air, is empty, and has a shape in which topographical features such as buildings, roads, and trees are densely located on the ground. Therefore, in expressing the center vectors indicating the center positions of each of the 3D lattice spaces, each component ($c_x$, $c_y$, and $c_z$) of the center vector is not independently expressed as data (e.g., real number) having a certain size (byte), and may be expressed more efficiently by expressing the data as a tree data structure (e.g., octree).

Here, various technologies are known for a method of transforming a vector into a tree data structure, and any one of these known technologies may be selectively applied. This specification describes a specific method for transforming a vector into a tree data structure, but it is not limited thereto.

In operation S220, the computing device 100 may transform the expression method of the offset vector.

In various embodiments, the computing device 100 may set a first reference range based on a length of one side of each of the plurality of 3D lattice spaces, and transform the offset vector for each of the plurality of 3D lattice spaces into a value within the first reference range.

Here, the mean vector is calculated using points included in each of the plurality of 3D lattice spaces, and the mean vector may not deviate from the 3D lattice space. In consideration of this, the computing device 100 may set the first reference range in consideration of the length of the 3D lattice space, and may transform the offset vector into the value within the first reference range set according to the length of the 3D lattice space. For example, for the regular hexahedron in which a length of one side of each of the plurality of 3D lattice spaces is 1, Expression 2 below is established.

$$-\frac{1}{2}l \le d_i \le \frac{1}{2}l \qquad < \text{Expression 2} >$$

Here, $d_i$ may denote the i-axis component value of the offset vector (degree of deviation from the center).

Accordingly, the computing device 100 may make each component of the offset vector for each of the plurality of 3D lattice spaces correspond to the range according to Expression 2 using a ratio of $d_i$ to length l within a limited range, and may transform the components into values within $$-\frac{1}{2}l \text{ to } \frac{1}{2}l.$$

Meanwhile, when each of the plurality of 3D lattice spaces is a rectangular parallelepiped, Expression 3 below is established.

$$-\frac{1}{2}m_i \le d_i \le \frac{1}{2}m_i \qquad < \text{Expression 3} >$$

Here, $m_i$ may denote the length of the rectangular parallelepiped in the i-axis direction, and di may denote the value of the i-axis component of the offset vector.

Accordingly, the computing device 100 may make each component of the offset vector for each of the plurality of 3D lattice spaces correspond to the range according to Expression 3 above using a ratio of $d_i$ to the length $m_i$ within a limited range as in the case of the regular hexahedron even when the 3D lattice space is the rectangular parallelepiped having the length $m_i$, and transform the components into values within a range of $$-\frac{1}{2}m_i \text{ to } \frac{1}{2}m_i.$$

Since l (or mi), which is the length of one side of the lattice space, has already been obtained in the process of partitioning the 3D lattice space, the offset vector may be specified by specifying only the ratio of the offset vector to the length l (or mi), and since the offset vector is a value within the range according to Expression 2 or 3, the reliable compression may be performed using small data using the ratio having a value within a finite range of −½ to ½. For example, when the ratio of the offset vector is expressed as 1 byte ($2^8$) according to the above method, di may be expressed within an error of $\frac{1}{256}$%.

In operation S230, the computing device 100 may generate the compressed mean vector data using the center position coordinate value of the mean vector data processed in operation S210 and the compressed mean vector data using the offset vector processed in operation S220.

Typically, the 3D mean vector is expressed as three real numbers, and when each real number is expressed as a single-precision floating-point number, each real number is expressed as 4 bytes per real number, and thus a total of 12 bytes are required to express the 3D mean vector.

On the other hand, when the expression method of the center vector is transformed using an octree having a depth of L as described above, since the data size required to represent the center vector is only about $\frac{1}{7}$ bytes per 3D lattice space in the best case and only about L-ceil($\log_8$n)+ (1+$\frac{1}{7}$) bytes are required per 3D lattice space even in the worst case, the center vector can be effectively compressed.

In addition, in expressing the offset vector for a plurality of 3D lattice spaces, since a value within the first reference range may be expressed as only one byte without using several bytes to express an exact real value for the offset vector, there is an advantage that the offset vector can be effectively compressed with an error of less than 0.5% ($\frac{1}{256}$%).

Figure 5:
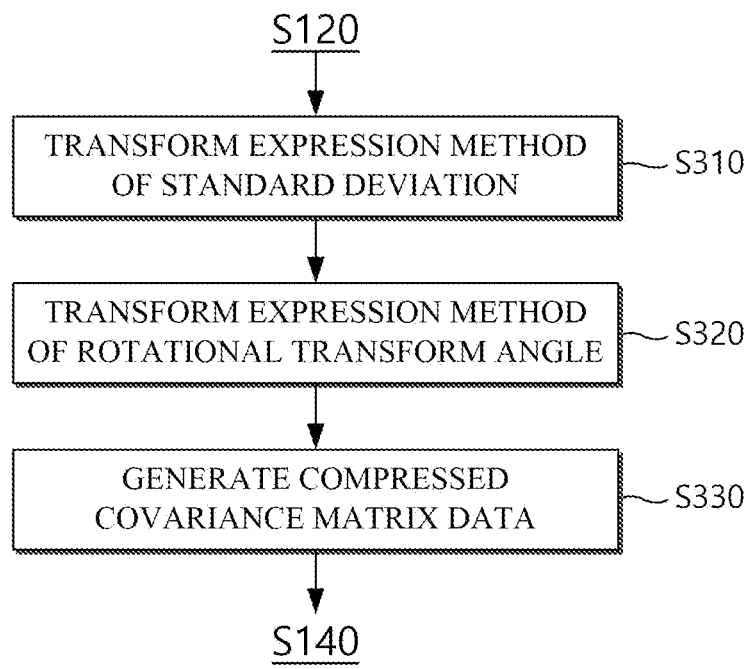
FIG. 5 is a flowchart for describing a method of processing covariance matrix data according to various embodiments.

FIG. 5 is a flowchart for describing a method of processing covariance matrix data according to various embodiments.

Referring to FIG. 5, in operation S310, the computing device 100 may transform the method of expressing a standard deviation.

In various embodiments, the computing device 100 may set the second reference range based on the length of the longest diagonal within the plurality of 3D lattice spaces, and transform the standard deviation for each of the plurality of 3D lattice spaces into the value within the second reference range.

Here, since the standard deviation is calculated using points included in each of the plurality of 3D lattice spaces, the standard deviation may not deviate from the 3D lattice space either, and needs to be equal to or smaller than half the length of the longest diagonal of the 3D lattice space. In consideration of this, the computing device 100 may set the second reference range using the length half the longest diagonal of the 3D lattice space, and may transform the standard deviation into the value within the second reference range set according to the length half the longest diagonal of the 3D lattice space.

Figure 6:
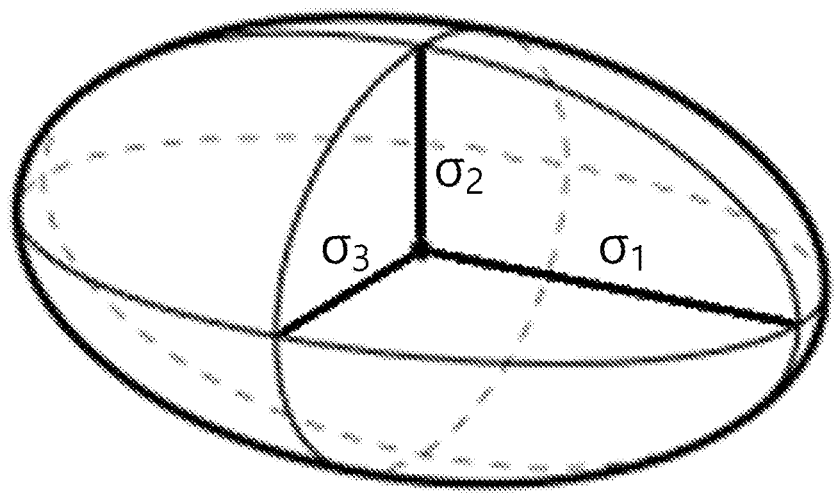
FIG. 6 is a diagram exemplarily illustrating the covariance matrix data expressed as an ellipsoid in various embodiments.

In one embodiment, when the covariance matrix is expressed as the ellipsoid, the length of each axis is expressed as three standard deviations as illustrated in FIG. 6, and the ellipsoid may rotate, and thus all ellipsoids in any direction may be expressed. In this case, since the direction may be arbitrarily set through the rotation of the ellipsoid, there is no problem in expressing all the ellipsoids even if conditions such as the following Expression 4 are set.

$$\sigma_1 \geq \sigma_2 \geq \sigma_3 \qquad \text{<Expression 4>}$$

Here, $\sigma_1$ may denote the standard deviation value of the longest axis when the covariance matrix is expressed as the ellipsoid, $\sigma_2$ may denote the standard deviation value of the second longest axis when the covariance matrix is expressed as the ellipsoid, and $\sigma_3$ may denote the standard deviation value of the shortest axis when the covariance matrix is expressed as the ellipsoid.

Here, since the covariance matrix is calculated using the points included in each of the plurality of 3D lattice spaces, the standard deviation value $\sigma_1$ of the longest axis needs to be equal to or smaller than half the length of the longest diagonal in the 3D lattice space. Accordingly, as one embodiment, for the regular hexahedron in which the length of one side of each of the plurality of 3D lattice spaces is 1, Expression 5 below is established.

$$\frac{\sqrt{3}}{2} l \geq \sigma_1 \geq \sigma_2 \geq \sigma_3 \geq 0 \qquad \text{< Expression 5 >}$$

Using this, each of $\sigma_1$, $\sigma_2$, and $\sigma_3$ can be expressed as in Expression 6 below, which satisfies Expression 7 below.

$$\sigma_1 = \frac{\sqrt{3}}{2} l\alpha, \; \sigma_2 = \beta\sigma_1, \; \sigma_3 = \gamma\sigma_2 \qquad \text{< Expression 6 >}$$

$$0 \leq \alpha, \beta, \gamma \leq 1 \qquad \text{< Expression 7 >}$$

Accordingly, since 1 is a known value, the computing device 100 may specify the standard deviations ($\sigma_1$, $\sigma_2$, and $\sigma_3$) by specifying $\alpha$, $\beta$, and $\gamma$, and the reliable compression may be performed using small data using $\alpha$, $\beta$, and $\gamma$ having values within a finite range of 0 to 1.

In various embodiments, the computing device 100 may set the compression degree for each of the mean vector data and the covariance matrix data based on the preset registration performance, process the mean vector data and the covariance matrix data according to the set compression degree, and may set the compression degree of the covariance matrix data to be greater than or equal to that of the mean vector data when the same registration performance is set.

The NDT-based registration technology, which is one of the widely known technologies in the SLAM field, refers to a technology to find a transformation with the maximum similarity between NDT maps and sensor data by registering pre-produced NDT maps with real-time sensor data (e.g., Lidar point cloud data).

Here, the registration refers to a process of increasing similarity by matching different three-dimensional point clouds (e.g., NDT maps produced using previously acquired point cloud data and point cloud data acquired in real time), and the registration performance may refer to similarity and/or matching speed between two different pieces of data (e.g., different 3D point clouds).

In the NDT-based registration technology, since the standard deviation representing the value of the shape has a relatively small effect on the registration performance compared to the rotational transform angle or the mean vector, aggressive approximation (compression) is possible compared to the mean vector or rotational transform angle. Accordingly, the computing device 100 may perform more aggressive approximation for the standard deviation compared to the rotational transform angle or the mean vector, even if the same registration performance is required. For example, $\beta$ and $\gamma$ may be expressed in units of $\frac{1}{16}$ using 4 bits each, and a may be expressed in units of $\frac{1}{256}$ using 1 byte (based on the commonly used value of 1).

In operation S320, the computing device 100 may transform the expression method of the rotational transform angle.

In various embodiments, the computing device 100 may set a reference rotation range for each of the X axis, Y axis, and Z axis, and may transform the rotational transform angle into a value within the reference rotation range. For example, the X axis, Y axis, and Z axis may be arbitrary axes orthogonal to each other.

The rotational transform angles of each of the plurality of normal distributions are expressed as three values ($\theta_x$, $\theta_y$, and $\theta_z$). When the rotational transformation for each x, y, and z axis is $R_x$, $R_y$, and $R_z$, the general rotational transformation may be expressed as Expression 8 below, and each rotation range may satisfy Expression 9 below.

$$R(\theta_x, \theta_y, \theta_z) = R_z(\theta_z) R_y(\theta_y) R_x(\theta_x) \qquad \text{<Expression 8>}$$

$$0° \leq \theta_x \leq 180°, \; 0° \leq \theta_y \leq 90°, \; 0° \leq \theta_z \leq 360° \qquad \text{[Expression 9]}$$

Accordingly, instead of expressing an arbitrary real value for a direction, the computing device 100 may express a value within a finite range as in Expression 9 above according to the required accuracy.

In operation S330, the computing device 100 may generate the compressed covariance matrix data using the standard deviation of the covariance matrix data processed through the operation S310 and the rotational transform angle of the covariance matrix data processed through the operation S320.

That is, since the covariance matrix data is expressed as a product of a matrix D including standard deviation information and a matrix Q including rotational transform angle information as in Expression 10 below, by compressing a standard deviation included in the matrix D and a rotational transform angle included in the matrix Q, the covariance matrix data is compressed.

$$(C) = (Q)(D)(Q^T) \qquad \text{<Expression 10>}$$

Here, C may denote the covariance matrix data, Q may denote the matrix including the rotational transform angle information, and D may denote the matrix including the standard deviation information.

Typically, each 3D covariance matrix data is expressed as 6 real numbers because it is a 3×3 symmetric matrix, and when each real number is expressed as a single-precision floating-point number, each real number is expressed as 4 bytes, and a total of 24 bytes are required to express the 3D covariance matrix data.

On the other hand, as described above, instead of using several bytes to express the standard deviation of the covariance matrix data as an exact real value, there is an advantage that the standard deviation may be expressed as fewer bytes as a value within the second reference range according to the required accuracy within a finite range, for example, only a total of 2 bytes (e.g., a is 1 byte, and β and γ each are 4 bits), and thus can be effectively compressed.

In addition, instead of expressing an arbitrary real value for the direction, the real value is expressed according to the required accuracy as a value within a finite range. For example, since 8 bits may express 256 values, 180° can be sufficiently expressed. As a result, as each of the three values $\theta_x$, $\theta_y$, and $\theta_z$ is expressed as, for example, 8 bits, 7 bits, and 9 bits and thus expressed only by a total of 3 bytes, there is an advantage that it is possible to effectively compress the rotational transform angle. Since the specific numerical values herein are exemplary, the present invention does not need to be limited thereto.

Referring back to FIG. 3, in operation S140, the computing device 100 may generate the compressed NDT map using the compressed mean vector data generated by processing the mean vector data through operation S120 and the covariance matrix data generated by processing the covariance matrix data through operation S130.

That is, the NDT map data is a normal distribution set, and each normal distribution is defined by a 3D mean vector and a 3×3 covariance matrix. As the 3D mean vector is expressed by three real numbers and the covariance matrix is expressed by six real numbers (when expressed as a single-precision floating-point number), the 3D mean vector has a total size of 36 bytes, whereas, since the compressed NDT map data generated according to the method of compressing NDT map data according to various embodiments of the present invention has a size of about 10 bytes, it is possible to dramatically reduce the size of the NDT map data.

In various embodiments, the computing device 100 may calculate a frequency for each of the plurality of objects included in the NDT map data, and may set the compression degree of the mean vector data and the covariance matrix data for an area corresponding to each of the plurality of objects on the NDT map data based on the calculated frequency and process each of the mean vector data and the covariance matrix data according to the set compression degree.

Normally, the normal distributions included in the NDT map data used in the autonomous driving system may be composed of normal distributions with a specific tendency, not any normal distribution. For example, the normal distribution included in the NDT map data mainly expresses a road surface and topographical features around a road such as buildings and trees.

When mainly analyzing the shape of the covariance matrix data, in general, it can be seen that a road surface or a building surface mainly has a flat disk-shaped ellipsoid shape, trees and electric poles have a long rugby-ball-shaped ellipsoid shape, and other portions have various ellipsoid shapes.

In addition, since the normal distributions are results obtained using points included in each of the plurality of 3D lattice spaces, there may be a dependency between the mean vector data and the covariance matrix data and a dependency between the direction and shape of the covariance matrix data.

That is, there are impossible combinations; for example, the mean vector data may not have specific values when the covariance matrix data has a specific value, or the mean vector data has a specific value when the covariance matrix data has a specific value.

In consideration of this, the computing device 100 may statistically calculate the frequency for each of the plurality of objects by discretizing the normal distributions corresponding to each of the plurality of 3D lattice spaces, and set a compression degree for a normal distribution corresponding to an object whose frequency is greater than or equal to the reference value to be high based on the calculated frequency to compress frequently occurring normal distributions more aggressively so that the frequently occurring normal distributions may be expressed in smaller data sizes, and sets a compression degree for a normal distribution corresponding to an object whose frequency is less than the reference value to be relatively low, so that the normal distribution which appears relatively infrequently may be expressed as data of a larger size.

In various embodiments, when a first object and a second object disposed in mutually adjacent positions among a plurality of objects included in the NDT map data have the same property, the computing device 100 may group the first object and the second object into a group, integrate normal distribution sets for the first object and the second object grouped into one group to generate one set of mean vector data and one set of covariance matrix data, and process the generated one set of mean vector data and one set of covariance matrix data.

In general, among the plurality of normal distributions included in the NDT map data, there is often a dependency between adjacent normal distributions. For example, on a road surface, most of the adjacent normal distributions have a flat disk shape and are uniformly arranged, and in the case of trees and electric poles, normal distributions in the form of side-by-side rugby balls expressing pillars and normal distributions of a flat disk shape representing a floor are arranged with a specific positional relationship to each other. Accordingly, in consideration of this point, the computing device 100 may perform stronger compression by bundling normal distributions having the same attribute (e.g., type) or a specific positional relationship and processing the bundled normal distributions as one object.

In various embodiments, the computing device 100 may extract the compressed NDT map data using the NDT map data as an input of the pre-trained artificial intelligence model.

Here, the pre-trained model includes an encoder and a decoder, and may be a model trained using pieces of compressed NDT map data as training data, for example, an autoencoder, but is not limited thereto.

The autoencoder includes an encoder that transforms given data into a code which is small-dimensional data, and a decoder that restores the given data back to the given data using a code, and is a model that finds the optimal encoder/decoder pair by training a large amount of training data, that is, a model that automatically finds an optimal encoding technique using statistical properties, that is, the tendency and/or dependence between normal sets as described above, through the process of training a large amount of training data.

Accordingly, the computing device 100 may process the pieces of compressed NDT map data, that is, the NDT map data, through an artificial intelligence model trained using a code of a size designed to design a normal distribution or a normal distribution set as training data, thereby generating compressed NDT map data according to the optimal encoding technique.

A method of compressing NDT map data for an autonomous driving system has been described above with reference to the flowchart illustrated in the drawing. For a simple explanation, the method of compressing NDT map data for an autonomous driving system has been described by showing a series of blocks, but the present invention is not limited to the order of the blocks, and some blocks may be performed in an order different from that shown and performed in the present specification, or may be performed concurrently. In addition, new blocks not described in the present specification and drawings may be added, or some blocks may be deleted or changed.

According to various embodiments of the present invention, by processing an expression method of NDT map data generated by modeling a 3D point cloud for a predetermined area as a normal distribution set to generate the NDT map data, it is possible to greatly reduce restrictions on scalability of a driving area of an autonomous driving system and improve efficiency of autonomous driving where a stable real-time operation is important.

The effects of the present invention are not limited to the above-described effects, and other effects that are not mentioned may be obviously understood by those skilled in the art from the above-described detailed description.

Although embodiments of the present invention have been described with reference to the accompanying drawings, those skilled in the art will appreciate that various modifications and alterations may be made without departing from the spirit or essential feature of the present invention. Therefore, it should be understood that the above-described embodiments are not restrictive but are exemplary in all aspects.

What is claimed is:

1. A method of compressing normal distribution transform (NDT) map data generated by modeling a three-dimensional (3D) point cloud for a predetermined area as a normal distribution set for an autonomous driving system, which is performed by a computing device, the method comprising:
    collecting the 3D point cloud for the predetermined area through sensors mounted on an autonomous driving vehicle travelling within the predetermined area;
    generating a plurality of 3D lattice spaces by latticing the 3D point cloud for the predetermined area;
    modeling each of the 3D point clouds included in each of the plurality of generated 3D lattice spaces as a plurality of normal distributions;
    calculating a mean vector for each of the plurality of normal distributions corresponding to each of the plurality of generated 3D lattice spaces, and generating mean vector data using the calculated mean vector;
    calculating a covariance matrix for each of the plurality of normal distributions corresponding to each of the generated 3D lattice spaces, and generating covariance matrix data using the calculated covariance matrix;
    generating NDT map data for the predetermined area using the generated mean vector data and the generated covariance matrix data,
    wherein the generated mean vector data includes a center vector for a center position of each of the plurality of generated 3D lattice spaces and an offset vector from the center position;
    processing the generated mean vector data included in the NDT map data;
    processing the generated covariance matrix data included in the NDT map data;
    generating compressed NDT map data using the processed mean vector data and the processed covariance matrix data; and
    controlling driving operations of the autonomous driving vehicle by using the compressed NDT map data,
    wherein the processing of the generated mean vector data includes:
    transforming an expression method of the center vector;
    transforming an expression method of the offset vector; and
    generating compressed mean vector data using the transformed center vector and the transformed offset vector.

2. The method of claim 1, wherein the transforming of the expression method of the center vector includes transforming the center vector into a form of a tree data structure,
    wherein the tree data structure includes one or more nodes, and the one or more nodes have a non-linear hierarchical structure.

3. The method of claim 1, wherein the transforming of the expression method of the offset vector includes:
    setting a first reference range based on a length of any one side of each of the plurality of generated 3D lattice spaces; and
    transforming a component of the offset vector for each of the plurality of generated 3D lattice spaces into a value within the set first reference range.

4. The method of claim 1, wherein the generated covariance matrix data includes a standard deviation and a rotational transform angle of points included in each of the plurality of generated 3D lattice spaces, and
    the processing of the covariance matrix data includes:
    transforming an expression method of the standard deviation;
    transforming an expression method of the rotational transform angle; and
    generating compressed covariance matrix data using the transformed standard deviation and the transformed rotational transform angle.

5. The method of claim 4, wherein the transforming of the expression method of the standard deviation includes:
    setting a second reference range based on a length of a diagonal in the plurality of generated 3D lattice spaces; and
    transforming the standard deviation for each of the plurality of generated 3D lattice spaces into a value within the set second reference range.

6. The method of claim 4, wherein the transforming of the expression method of the rotational transform angle includes:
    setting a reference rotation range for each of an X axis, a Y axis, and a Z axis; and
    transforming the rotational transform angle into a value within the set reference rotation range.

7. The method of claim 1, further comprising:
setting a compression degree for each of the mean vector data and the covariance matrix data based on a preset registration performance; and
processing the mean vector data and the covariance matrix data according to the set compression degree,
wherein, when the same registration performance is set, the compression degree of the covariance matrix data is set to be greater than or equal to the compression degree of the mean vector data.

8. The method of claim 1, further comprising:
calculating a frequency for each of a plurality of objects included in the NDT map data; and
setting a compression degree of mean vector data and covariance matrix data for areas corresponding to each of the plurality of objects on the NDT map data based on the calculated frequency.

9. The method of claim 1, further comprising, when a first object and a second object disposed in mutually adjacent positions among a plurality of objects included in the NDT map data have the same attribute, grouping the first object and the second object into one group,
wherein the processing of the mean vector data includes combining mean vector data of objects included in the one group to generate one set of mean vector data and processing the generated mean vector data, and
the processing of the covariance matrix data includes combining covariance matrix data of the objects included in the one group to generate one set of covariance matrix data and processing the generated one set of covariance matrix data.

10. The method of claim 1, further comprising grouping two or more objects having a preset positional relationship among a plurality of objects included in the NDT map data,
wherein the processing of the mean vector data includes combining mean vector data of objects included in the one group to generate one set of mean vector data and processing the generated mean vector data, and
the processing of the covariance matrix data includes combining covariance matrix data of the objects included in the one group to generate one set of covariance matrix data and processing the generated one set of covariance matrix data.

11. The method of claim 1, further comprising extracting the compressed NDT map data using the NDT map data as an input of a pre-trained artificial intelligence (AI) model,
wherein the pre-trained AI model includes an encoder and a decoder and is a model trained using pieces of compressed NDT map data as training data.

12. A computing device for performing a method of compressing NDT map data for an autonomous driving system, the computing device comprising:
a processor;
a network interface;
a memory; and
a computer program loaded into the memory and executed by the processor,
wherein the computer program includes:
an instruction for collecting a 3D point cloud for a predetermined area through sensors mounted on an autonomous driving vehicle travelling within the predetermined area;
an instruction for generating a plurality of 3D lattice spaces by latticing the 3D point cloud for the predetermined area;
an instruction for modeling each of the 3D point clouds included in each of the plurality of generated 3D lattice spaces as a plurality of normal distributions;
an instruction for calculating a mean vector for each of the plurality of normal distributions corresponding to each of the plurality of generated 3D lattice spaces, and generating mean vector data using the calculated mean vector;
an instruction for calculating a covariance matrix for each of the plurality of normal distributions corresponding to each of the generated 3D lattice spaces, and generating covariance matrix data using the calculated covariance matrix; and
an instruction for generating NDT map data for the predetermined area using the generated mean vector data and the generated covariance matrix data,
wherein the generated mean vector data includes a center vector for a center position of each of the plurality of generated 3D lattice spaces and an offset vector from the center position;
an instruction for processing the generated mean vector data included in the NDT map data;
an instruction for processing covariance matrix data included in the NDT map data;
an instruction for generating the generated compressed NDT map data using the processed mean vector data and the processed covariance matrix data;
an instruction for controlling driving operations of the autonomous driving vehicle by using the compressed NDT map data,
wherein the instruction for processing of the generated mean vector data includes:
an instruction for transforming an expression method of the center vector;
an instruction for transforming an expression method of the offset vector; and
an instruction for generating compressed mean vector data using the transformed center vector and the transformed offset vector.

13. A non-transitory computer-readable medium having stored therein a computer program for causing a computing apparatus to execute the following operations of:
collecting a 3D point cloud for a predetermined area through sensors mounted on an autonomous driving vehicle travelling within the predetermined area;
generating a plurality of 3D lattice spaces by latticing the 3D point cloud for the predetermined area;
modeling each of the 3D point clouds included in each of the plurality of generated 3D lattice spaces as a plurality of normal distributions;
calculating a mean vector for each of the plurality of normal distributions corresponding to each of the plurality of generated 3D lattice spaces, and generating mean vector data using the calculated mean vector;
calculating a covariance matrix for each of the plurality of normal distributions corresponding to each of the generated 3D lattice spaces, and generating covariance matrix data using the calculated covariance matrix;
generating NDT map data for the predetermined area using the generated mean vector data and the generated covariance matrix data,
wherein the generated mean vector data includes a center vector for a center position of each of the plurality of generated 3D lattice spaces and an offset vector from the center position;
processing the generated mean vector data included in the NDT map data;

processing the generated covariance matrix data included in the NDT map data;

generating compressed NDT map data using the processed mean vector data and the processed covariance matrix data; and controlling driving operations of the autonomous driving vehicle by using the compressed NDT map data, wherein the processing of the generated mean vector data includes:

transforming an expression method of the center vector;

transforming an expression method of the offset vector; and generating compressed mean vector data using the transformed center vector and the transformed offset vector.

* * * * *